May 25, 1965 J. D. LINCOLN ETAL 3,185,610
APPARATUS FOR LAMINATING A CONTINUOUS HONEYCOMB SANDWICH
Filed May 27, 1959 9 Sheets-Sheet 9

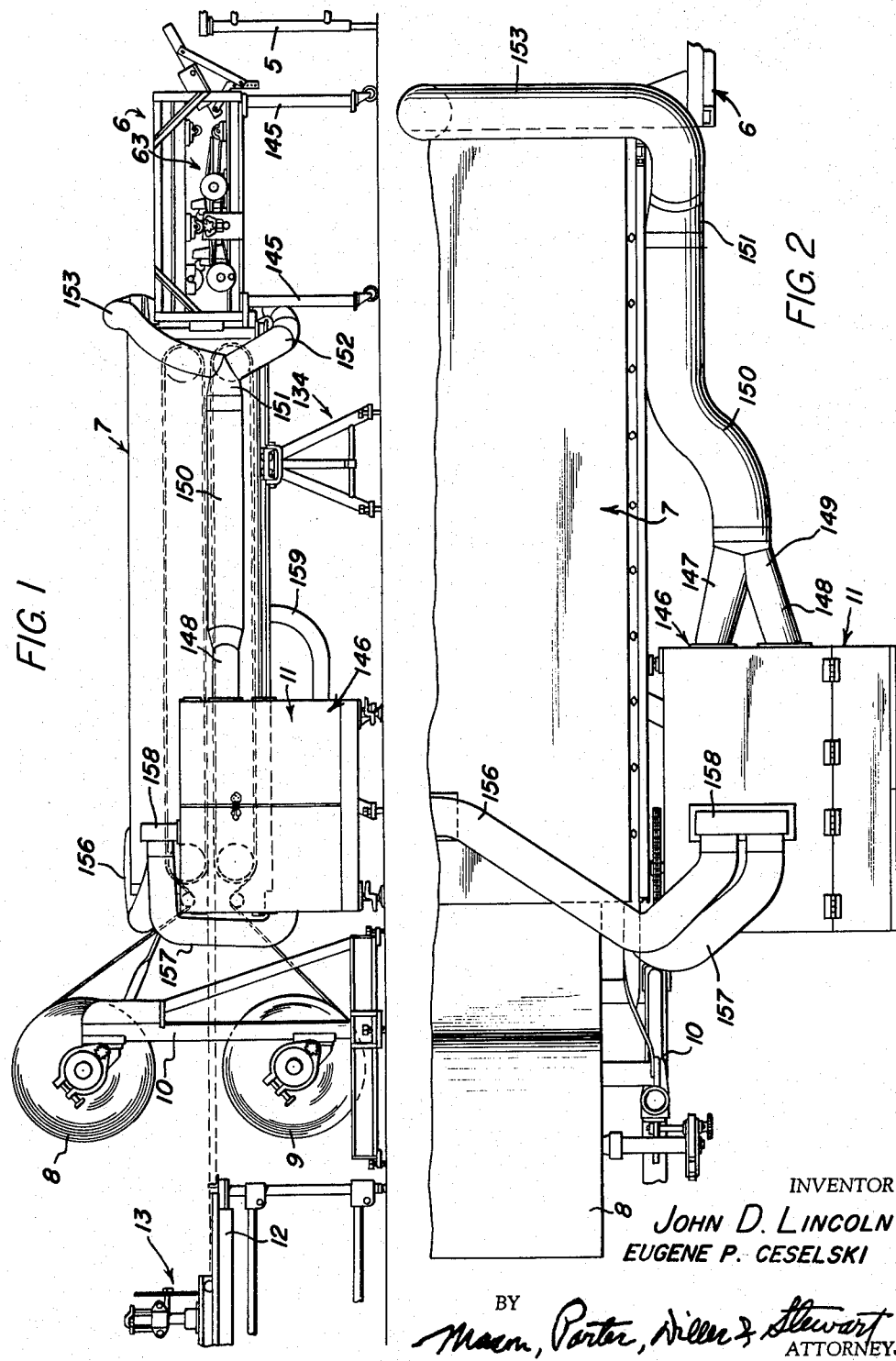

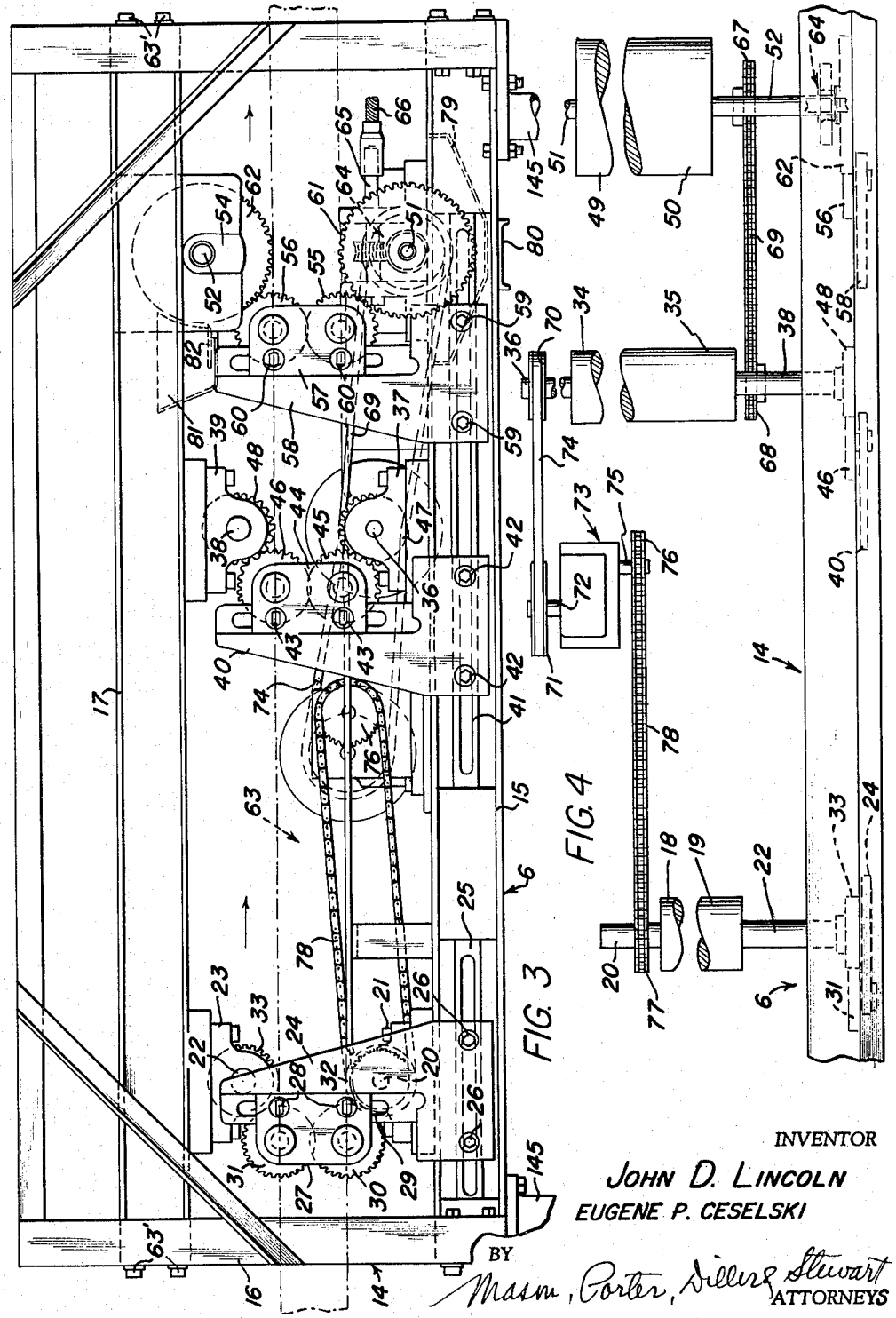

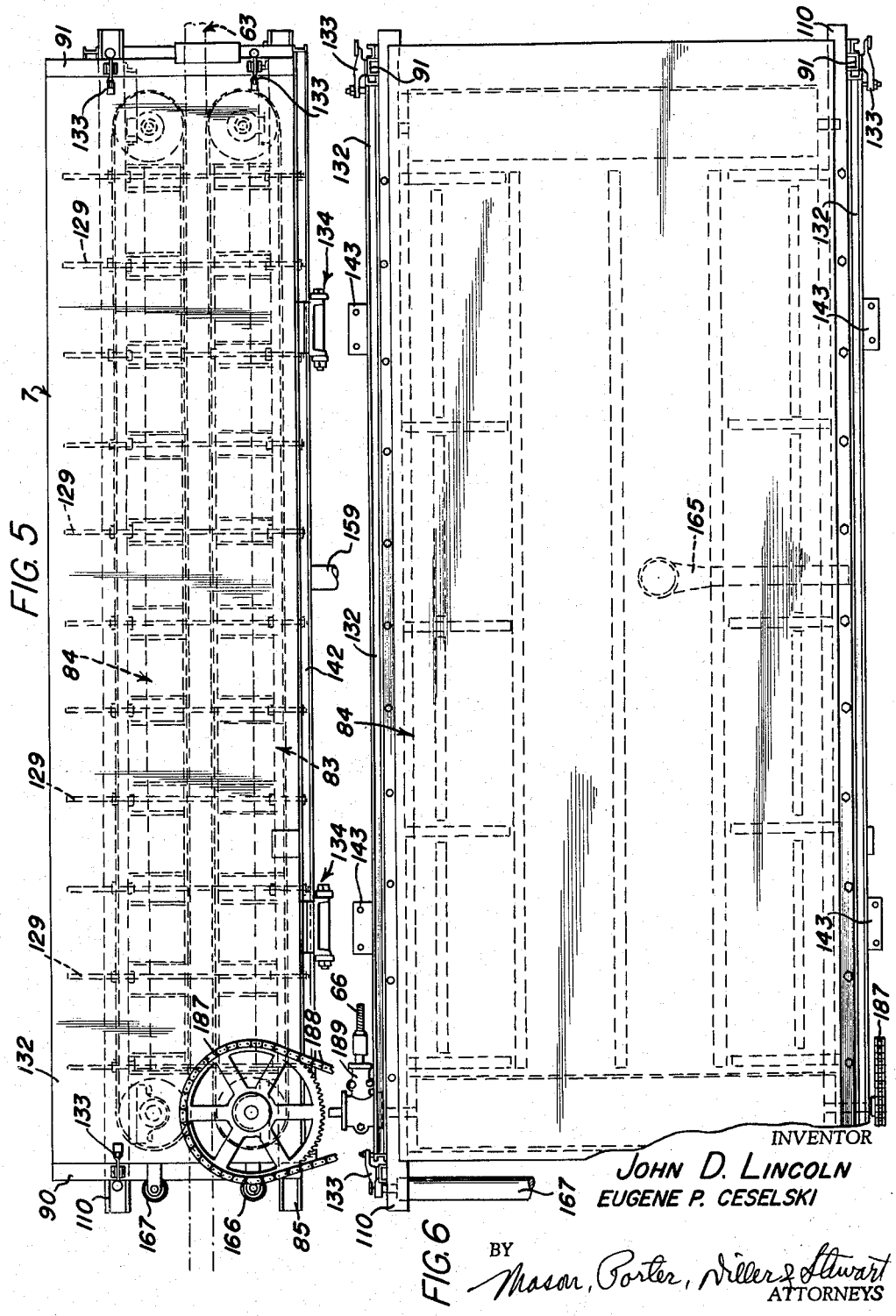
INVENTOR
JOHN D. LINCOLN
EUGENE P. CESELSKI

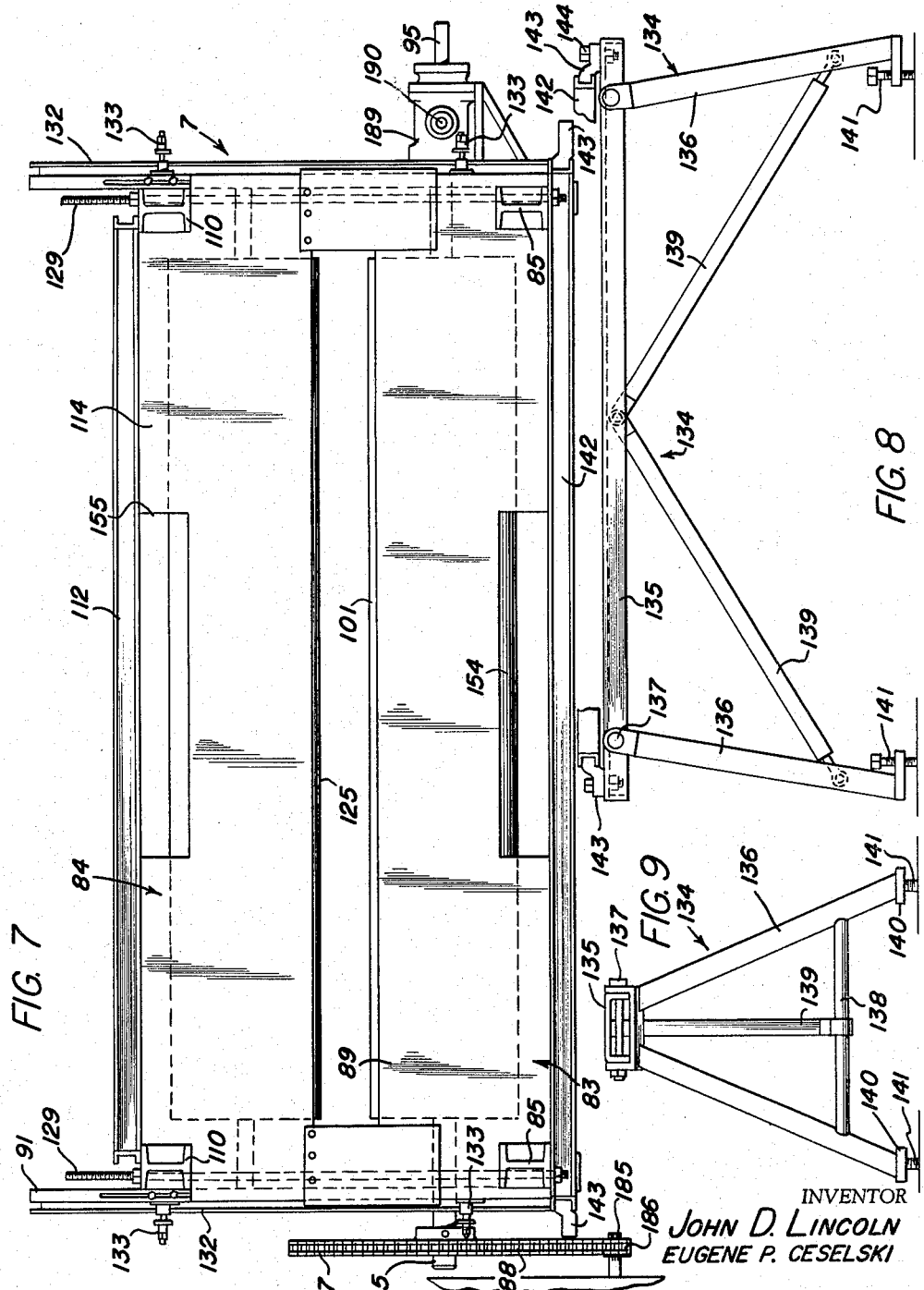

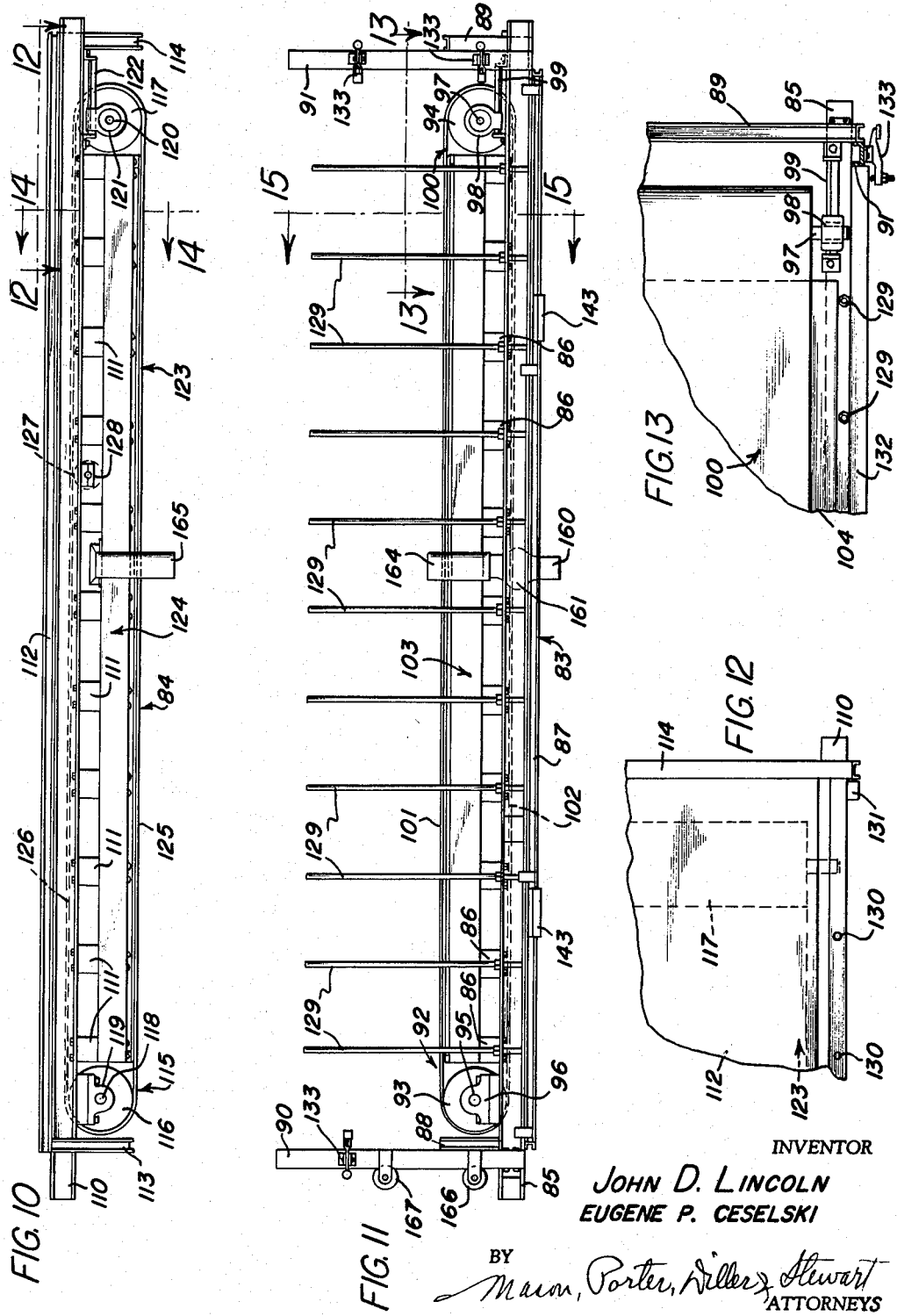

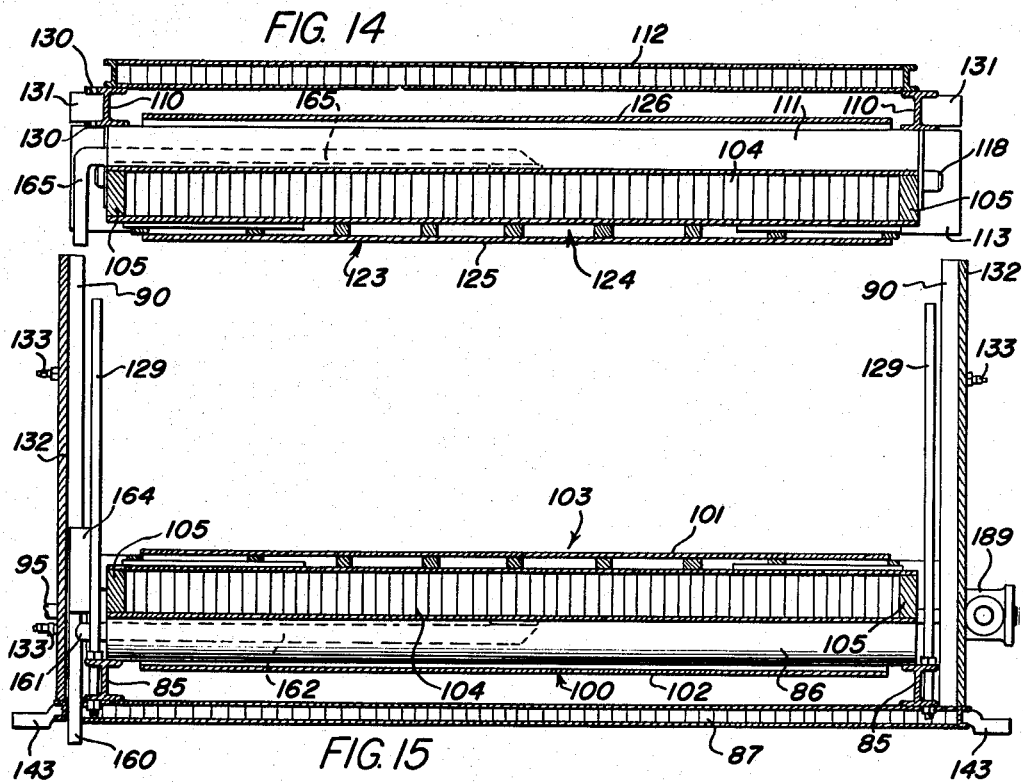
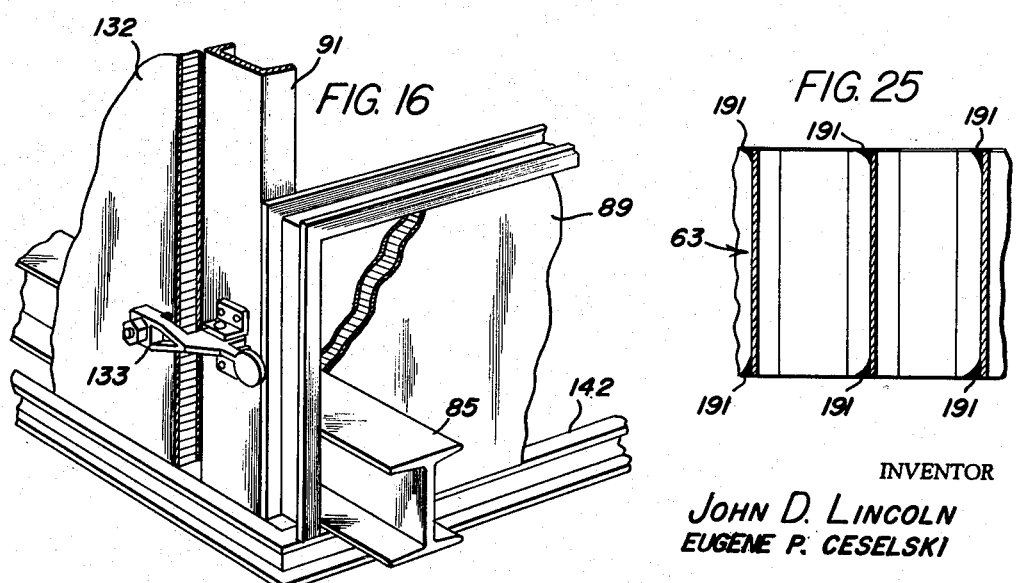

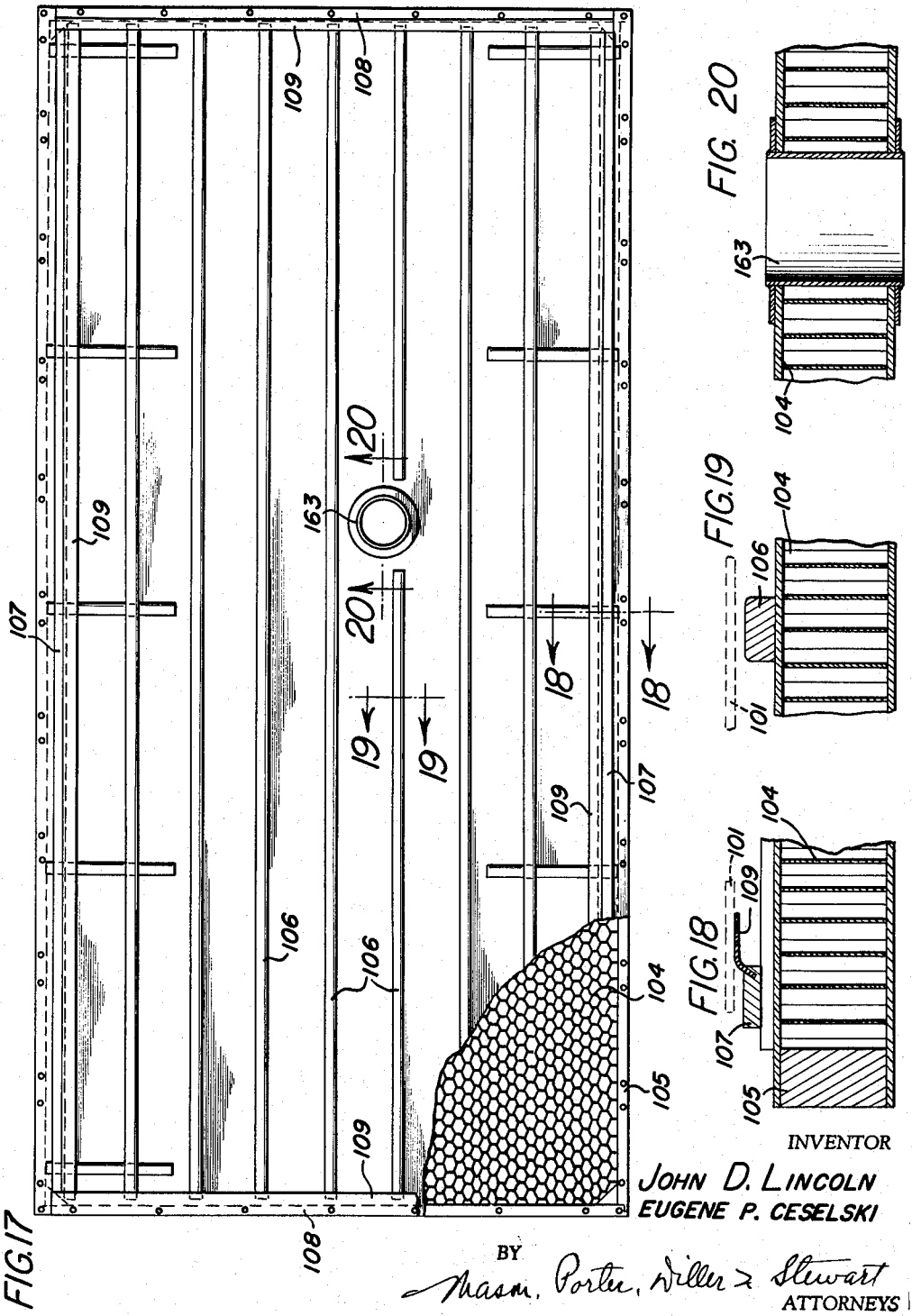

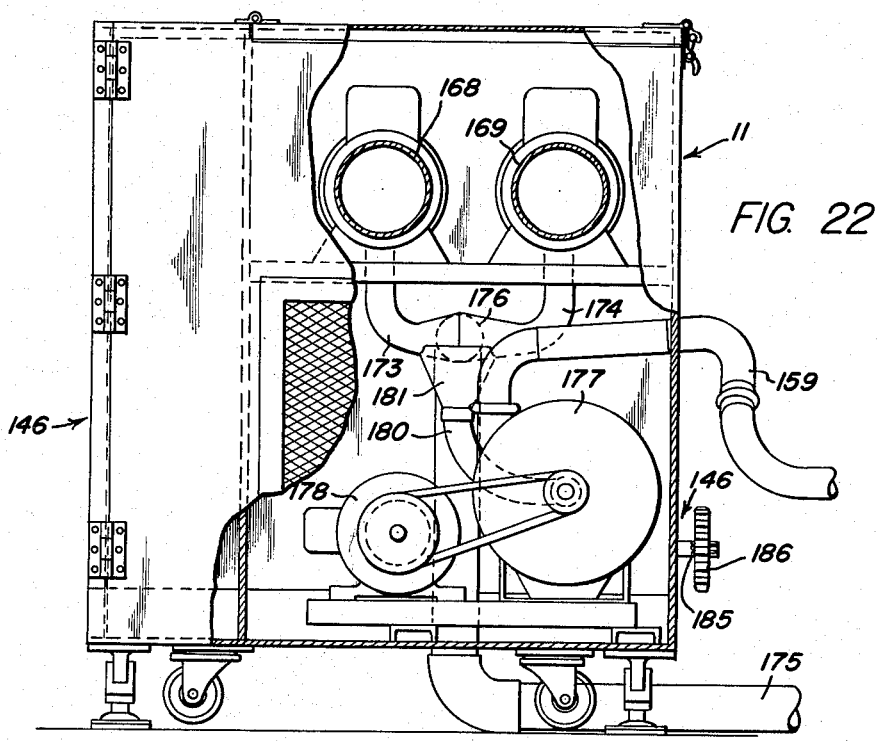
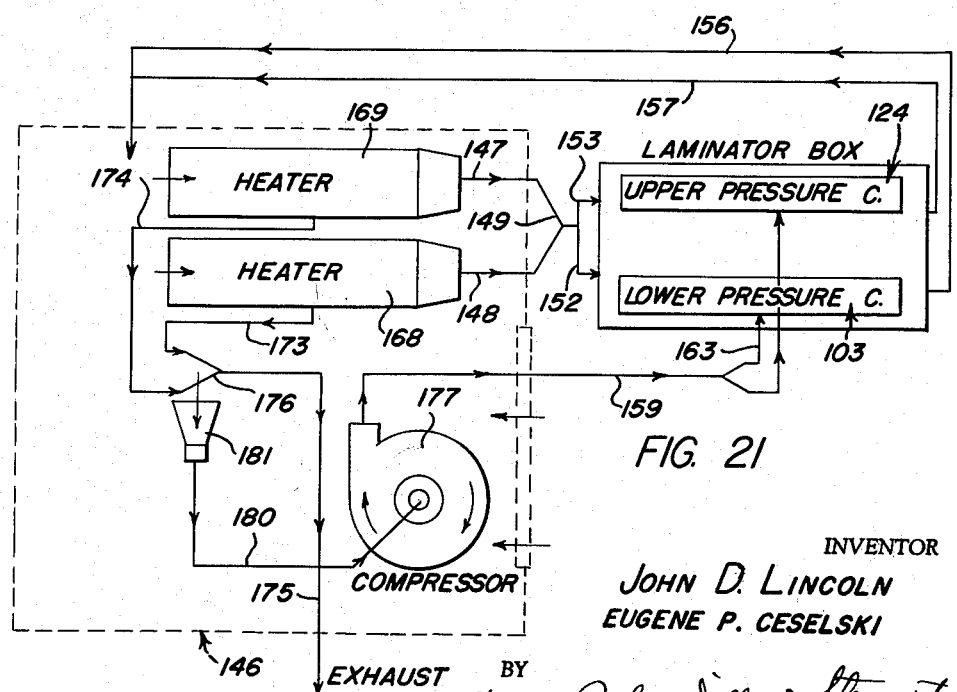

INVENTOR
JOHN D. LINCOLN
EUGENE P. CESELSKI
BY
ATTORNEYS

United States Patent Office 3,185,610
Patented May 25, 1965

3,185,610
APPARATUS FOR LAMINATING A CONTINUOUS HONEYCOMB SANDWICH
John D. Lincoln and Eugene P. Ceselski, Mount Vernon, Ohio, assignors to Continental Can Company, Inc., New York, N.Y., a corporation of New York
Filed May 27, 1959, Ser. No. 816,172
23 Claims. (Cl. 156—549)

The invention relates in general to the art of forming honeycomb structures and primarily seeks to provide a novel apparatus for laminating a continuous honeycomb sandwich.

In the formation of honeycomb sandwiches, it is necessary to adhesively bond facing sheets or layers to a honeycomb core, which core presents only relatively narrow edges for the formation of the bond. It is therefore essential that each and every bond between the honeycomb core and the facing sheets be completely formed.

It is therefore another object of this invention to provide an apparatus for laminating honeycomb sandwiches, the apparatus including a pair of endless conveyor belts which are disposed above and below the components of the honeycomb sandwiches, and which belts apply an even pressure on the facing sheets during the laminating operation, even though the components of the sandwiches are moving at a constant rate.

Another object of the invention is to provide a novel apparatus for the formation of honeycomb sandwiches, the construction of the apparatus being such that the facing sheets, honeycomb core, and adhesive of the honeycomb sandwiches are pre-heated prior to application of the facing sheets to the honeycomb core, each cell being filled with hot air before application of the sheets, and are further heated during the bonding of the sheets to the core whereby a complete and strong bond between the facing sheets and the honeycomb core is effected.

Still another object of the invention is to provide a novel honeycomb expander and adhesive applicator for use in conjunction with a honeycomb sandwich laminator, the honeycomb expander and adhesive applicator including a plurality of rolls of which at least two sets are feed rolls which are driven at different rates so as to uniformly and progressively expand the honeycomb, and at least two others of the rolls being glue or adhesive applicator rolls which will apply to the edge surfaces of the honeycomb cell the desired adhesive required for bonding the honeycomb to facing sheets.

Another object of the invention is to provide a novel apparatus for the formation of honeycomb sandwiches, the apparatus including endless conveyor belts having opposed parallel runs which clamp therebetween components of a honeycomb sandwich while the components are being fed therebetween to hold the components in place relative to one another so that an adhesive securing together the components may form a strong bond, the spacing between the conveyor belt runs being adjustable to accommodate various thicknesses of sandwiches.

Yet another object of the invention is to provide a novel honeycomb expander and adhesive applicator which includes sets of feed rolls for expanding honeycomb and a set of adhesive applicator rolls for applying adhesive to edges of honeycomb cells, the supports for one roll of each set of rolls being adjustably positioned whereby the spacing between rolls of said sets of rolls may be varied to accommodate honeycomb cores of varied thicknesses.

Still another object of the invention is to provide a novel mechanism for simultaneously feeding a honeycomb sandwich and clamping together components thereof during a laminating process, the mechanism including a pair of conveyor belts having opposed runs disposed in floating pressurized contact with outer surfaces of facing sheets of the honeycomb sandwich, and means directly driving one only of the conveyor belts, the other of the conveyor belts being mounted for idling and driven by frictional contact with the sandwich, whereby all of the components of the sandwich are fed at the same rate and internal stresses in the sandwich and buckling of the facing sheets are eliminated.

A further object of the invention is to provide a novel heater construction for use in conjunction with the honeycomb laminator, the heater being primarily designed to provide heated air for flow over continuous webs which will form facing sheets of a honeycomb sandwich, and the heater including an exhaust pipe for the hot exhaust gases which is positioned adjacent the intake for a pressured air chamber whereby the heat from the exhaust gases may also be utilized in the heating of the facing sheets after they have been applied to the honeycomb core and during the bonding operation.

A still further object of the invention is to provide novel means for applying a pressure on facing sheets of the honeycomb sandwich during the lamination of such sandwiches, the means including a pair of endless conveyor belts which have opposed generally parallel runs for engaging the facing sheets of a honeycomb sandwich during a laminating operation, and there being provided an air chamber for each of the parallel runs which opposes the honeycomb sandwich during the laminating operation and which pressurizes the parallel run of the associated conveyor belt to exert a uniform pressure on the facing sheets during the laminating operation.

A still further object of the invention is to provide a portable apparatus for laminating honeycomb panels in a continuous operation, which may be readily assembled and disassembled for changing location and which apparatus includes means for first expanding slices of a honeycomb block, applying adhesive to the edges of the honeycomb cells, than applying facing sheets to the opposite surfaces of the honeycomb cells to form a continuous honeycomb sandwich, and finally cutting the continuous honeycomb sandwich into panels of the desired length.

Yet another object of the invention is to provide a novel apparatus for pre-heating facing sheets or webs during a honeycomb laminating operation, the apparatus utilized in laminating the honeycomb sandwich including a pair of endless conveyor belts having opposed runs for exerting even pressures on opposite faces of the honeycomb sandwich, and the facing web being fed first over a remote run of the conveyor belt and then between one of the opposed runs and the honeycomb core, there being provided a box in which the remote run of each conveyor belt travels, and there being provided means for directing heating air through this box so as to pre-heat the facing web prior to the application of the facing web to the honeycomb core, whereby the desired bond between the honeycomb core and the facing sheet may be formed.

With the above, and other objects in view that will hereinafter appear, the nature of the invention will be more clearly understood by reference to the following detailed description, the appended claims and the several views illustrated in the accompanying drawings.

In the drawings:

FIG. 1 is a side elevational view of the apparatus of the invention.

FIG. 2 is an enlarged fragmentary plan view of the laminator box and the heater assembly.

FIG. 3 is an enlarged side elevational view of the apparatus for expanding the honeycomb core and applying adhesive thereto, the lower portions of the supports being broken away.

FIG. 4 is a schematic plan view with portions broken away showing the drive for various rolls of the honeycomb expander and adhesive applicator.

FIG. 5 is an enlarged elevational view of the laminator box and shows the general arrangement of the components thereof, the lower portions of the supports being broken away.

FIG. 6 is an enlarged plan view of the laminator box.

FIG. 7 is an enlarged end view of the laminator box.

FIG. 8 is an enlarged elevational view of one of the supports for the laminator box.

FIG. 9 is an enlarged end view of the support of FIG. 8.

FIG. 10 is an enlarged side elevational view of the upper laminator box assembly.

FIG. 11 is an enlarged side elevational view of the lower laminator box assembly, side panels of the laminator box being omitted.

FIG. 12 is an enlarged fragmentary plan view of a corner portion of the upper laminator box assembly taken generally along the line 12, 12 of FIG. 10.

FIG. 13 is an enlarged fragmentary sectional view taken generally along the line 13, 13 of FIG. 11.

FIG. 14 is an enlarged transverse vertical sectional view taken along the line 14, 14 of FIG. 10 and shows the specific details of the construction of the upper laminator box.

FIG. 15 is an enlarged transverse vertical sectional view taken along the line 15, 15 of FIG. 11 and shows the specific details of construction of the lower laminator box assembly.

FIG. 16 is an enlarged fragmentary perspective view of a corner of the lower laminator box assembly and shows the general details of the frame construction thereof.

FIG. 17 is an enlarged plan view of a backing panel for one of the air chambers, portions of the backing panel being broken away and shown in section.

FIG. 18 is an enlarged fragmentary transverse vertical sectional view taken along the line 18, 18 of FIG. 17, and shows the manner in which a resilient sealing strip is carried by the backing panel, one of the conveyor belt runs being shown in dotted lines in its relation to the sealing strip.

FIG. 19 is an enlarged fragmentary sectional view taken along the line 19, 19 of FIG. 17, and shows the details of the backing panel in the center thereof.

FIG. 20 is an enlarged fragmentary longitudinal sectional view taken along the line 20, 20 of FIG. 17, and shows the formation of a fitting for the passage of an air duct through the backing panel.

FIG. 21 is a schematic view showing the arrangement of air lines for the laminator box and the means for supplying air to these air lines, including the relation of the heater with respect thereto.

FIG. 22 is an enlarged end view of the heater for the laminator box with portions of the housing of the heater being broken away to show the details of the components of the heater within the housing.

FIG. 25 is an enlarged fragmentary vertical sectional view taken through the honeycomb core showing the adhesive, as applied to the edges of the honeycomb core.

Figure 23:
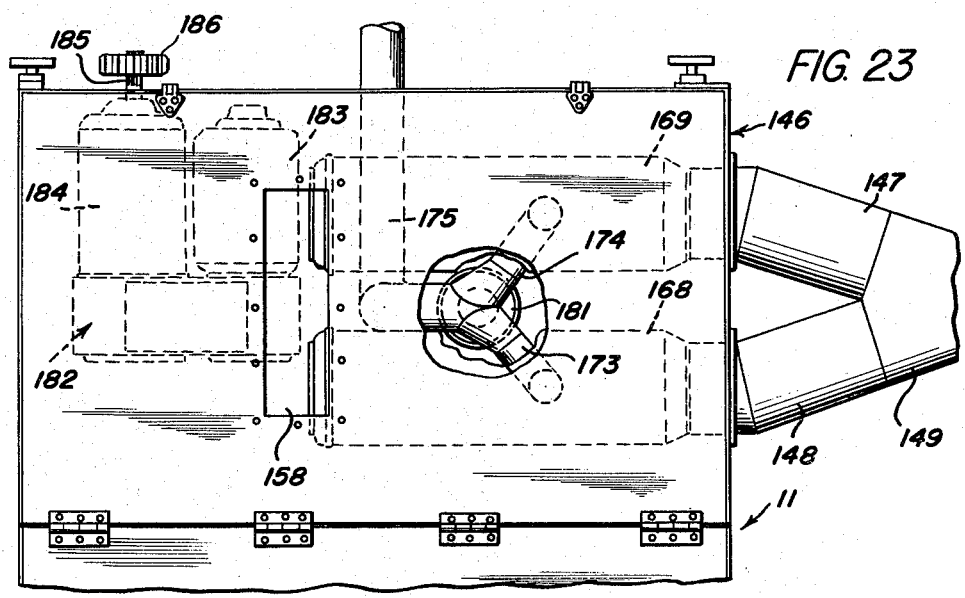
FIG. 23 is an enlarged fragmentary plan view of the heater with the arrangement of the components of the heater being shown in dotted lines, a small portion of the housing of the heater being broken away to show the details of the fitting connecting together exhaust lines of the heater.

Reference is first made to FIG. 1 of the drawings wherein the over-all details of the apparatus for laminating honeycomb sandwiches are illustrated. The apparatus includes a lay-out table 5 on which slices of honeycomb block are first positioned. The honeycomb slice then passes into an apparatus for expanding the honeycomb and applying adhesive thereto, the apparatus being generally referred to by the numeral 6. Disposed next to the apparatus 6 is a laminator box generally referred to by the numeral 7. In the laminator box 7 facing sheets or webs are applied to the honeycomb core, the facing webs being delivered to the laminator box from continuous rolls 8 and 9 which are mounted on a suitable stand 10. A control unit, generally referred to by the numeral 11, is associated with the laminator box 7 for both driving the elements of the laminator box and supplying air thereto. After the honeycomb sandwich has been formed in a continuous shape, it is passed on to a table 12 where it is cut to the desired lengths by a saw unit generally referred to by the numeral 13.

The details of the apparatus 6 are best illustrated in FIGS. 3 and 4. The apparatus 6 includes a suitable frame, generally referred to by the numeral 14. The frame 14 may be of any construction, but includes a pair of lower longitudinal frame rails 15 and standards 16 at the corners thereof. The frame 14 also includes a pair of intermediate frame members 17.

The apparatus 6 includes a first pair of feed rolls 18 and 19. The feed roll 18 includes a shaft 20 which has its ends rotatably journaled in pillow blocks 21 mounted on the lower frame rails 15. The upper feed roll 19 has a shaft 22 which is rotatably journaled in pillow blocks 23 secured to the underside of the frame members 17 in depending relation. A mounting bracket 24 is adjustably secured to the frame rail 16 by means of a fitting 25 mounted on the frame rail 15 and a pair of fasteners 26. The mounting bracket 24, in turn, supports a plate 27 which is mounted on the mounting bracket 24 for vertical movement by means of a pair of fasteners 28 which pass through an elongated slot 29 in the mounting bracket 24. The plate 27 supports a pair of drive gears 30 and 31, the drive gear 30 meshing with a drive gear 32 on the shaft 20 and the drive gear 31. The drive gear 31, in turn, meshes with a drive gear 33 on the shaft 22.

A second feed roll arrangement is mounted to the right of the feed rolls 18 and 19 in FIG. 3. The second feed roll arrangement includes a lower feed roll 34 and an upper feed roll 35. The feed roll 34 includes a shaft 36 which has its ends rotatably journaled in pillow blocks 37 carried by the frame rails 15. The feed roll 35 includes the shaft 38 which has its ends rotatably journaled in pillow blocks 39 secured to the underside of the frame members 17 in depending relation.

The feed roll 35 is driven from the feed roll 34 in the same manner as is the feed roll 19 from the feed roll 18. These means include an upstanding mounting bracket 40 which is mounted on the frame rail 15, associated therewith for longitudinal movement by means of the fitting 41, carried by the associated frame rail 15 and a pair of fasteners 42. A plate 44 is carried by the mounting bracket 40 for vertical movement and is adjustably secured to the mounting bracket 40 for such vertical movement by a pair of fasteners 43. The plate 44 supports a pair of drive gears 45 and 46. The drive gear 45 is meshed with a drive gear 47 on the shaft 36. The drive gear 45 is also meshed with the drive gear 46, which, in turn, is meshed with a drive gear 48 on the shaft 38.

A pair of glue or adhesive applicator rolls 49 and 50 are mounted on the frame 14 adjacent the right end thereof, as viewed in FIG. 3. The lower adhesive applicator roll 49 includes a shaft 51 which is journaled in a pair of pillow blocks carried by the frame 15. The adhesive applicator roll 49 includes a shaft 52 whose ends are rotatably journaled in pillow blocks 54 secured to the underside of the frame members in depending relation. The upper adhesive applicator roll 50 is driven from the lower adhesive applicator roll 49.

In order to provide for the driving of the upper adhesive applicator roll 50 over the lower adhesive applicator roll 49, a pair of drive gears 55 and 56 are provided. The drive gears 55 and 56 are supported by a plate 57 which is, in turn, supported by a mounting bracket 58. The mounting bracket 58 is secured to the associated frame rail 15 for longitudinal sliding movement by attachment to the fitting 41 by the use of a pair of fasteners 59. The plate 57 is adjustably secured to the mounting bracket 58 by a pair of fasteners 60 which permit vertical adjustment of the plate 57. The drive gear 55 is meshed with a drive gear 61 on the shaft 51. The drive gear 55 also meshes with the drive gear 56, which, in turn, meshes with a drive gear 62 on the shaft 52.

At this time it is pointed out that the spacing between the feed rolls 18 and 19, the feed rolls 34 and 35, and the adhesive applicator rolls 49 and 50 is the same. This spacing is equal to the thickness of the honeycomb core which is to be used in the formation of the honeycomb sandwich, and the honeycomb core is generally referred to by the numeral 63.

Should it be desired to utilize a honeycomb core which is either thicker or thinner than the honeycomb core 63, the apparatus 6 may be adjusted to accommodate this change in thickness. The adjustment of the apparatus 6 is accomplished by releasing bolts 63', which secure the ends of the frame member 17 to the standard 16, and raising or lowering the frame members 17, as is desired. For example, should it be desired to adjust the apparatus 6 to receive a honeycomb core of a thickness greater than that illustrated in FIG. 3, the bolts 64 are loosened and the frame members 17 are moved upwardly, after which the bolts 64 are again tightened. The upward movement of the feed rolls 19 and 35 and the adhesive applicator roll 50 will result in the movement of the drive gear 33, 48 and 62 out of mesh with the drive rollers 31, 46 and 56, respectively. It is then necessary to adjust the drive gears for the various upper rolls. This is accomplished by shifting the mounting bracket for the particular intermediate drive gears longitudinally of the frame 14 and the mounting plates for the same drive gears vertically. It will be readily apparent that by so shifting the mounting bracket and the mounting plates, the intermediate drive gears may again be properly meshed with the drive gears of the individual rolls.

The rolls of the apparatus 6 are driven by first driving the shaft 51. A suitable gear box, generally referred to by the numeral 64, is suitably connected to one end of the shaft 51. The gear box 64 includes an input shaft 65 which has one end of the flexible drive shaft 66 coupled thereto. The flexible drive shaft 66 is driven in the manner which will be described in detail hereinafter.

Referring now to FIG. 4 in particular, it will be seen that a sprocket 67 is mounted on the shaft 51 in alignment with a sprocket 68 which is mounted on the shaft 36. A chain 69 is entrained over the sprockets and drivingly connects together the shafts 51 and 36.

A pulley 70 is mounted on the shaft 36 on the opposite end thereof from the sprocket 68. The pulley 70 is aligned with a pulley 71 of an input shaft 72 for a conventional gear unit generally referred to by the numeral 73. The gear unit 73 may be of any type including conventional Reeves drive pulleys 70 and 71. A drive belt 74 is entrained over the pulleys 70 and 71 and drivingly connects together the shafts 36 and 72. Variable speed reduction is obtained through the pulleys 70, 71 and belt 74.

The gear unit 73 also includes an output shaft 75. A sprocket 76 is mounted on the output shaft 75 in alignment with the sprocket 77 secured to the shaft 20. A drive chain 78 is entrained over the sprockets 76 and 77 to drivingly connect together the shafts 75 and 20. It is to be understood that the adhesive applicator rolls 49 and 50 are driven at approximately the same peripheral speed as the feed rolls 34 and 35. On the other hand, the peripheral speed of the feed rolls 18 and 19 is much less than the peripheral speed of the feed rolls 34 and 35.

As a slice of a honeycomb block is placed into the left end of the apparatus 6, as viewed in FIG. 3, it is first gripped by the feed rolls 18 and 19 which advance the honeycomb at a predetermined rate. The honeycomb is next gripped by the feed rolls 34 and 35. Since the peripheral speed of the feed rolls 34 and 35 is a predetermined multiplication of the peripheral speed of the feed rolls 18 and 19, it will be apparent that the elongation or expansion of the honeycomb core 63 is controlled for the particular honeycomb which is being expanded. By adjusting the Reeves drive pulleys 70, 71, and belt 74, the apparatus 6 may readily accommodate other types of honeycomb cores which have different expansion factors.

An adhesive supply pan 79 extends generally between the frame rails 15 and is supported by a frame rail 80, the opposite ends of which are secured to the frame rails 15. The adhesive supply pan 79 is aligned with the adhesive applicator roll 49 and supplies the required amount of adhesive to the periphery of the surface of the adhesive applicator roll 49 whereby the desired adhesive may be applied to the underside of the honeycomb 63. A second adhesive supply pan 81 is supported by the frame members 17 adjacent the adhesive applicator roll 50. The adhesive supply pan 81 includes a doctor blade 82 which controls the flow of adhesive onto the peripheral surface of the upper adhesive applicator roll 50. There is a doctor blade on the adhesive applicator roll 49 that is similar to the doctor blade 82 on the adhesive pan 81. It is to be understood that the upper adhesive applicator roll 50 supplies the necessary adhesive coating to the upper surface of the honeycomb core surface 53. The doctor blades are, of course, adjustable in any conventional manner for controlling application of the adhesive.

The laminator box 7 includes a lower laminator box assembly, generally referred to by the numeral 83, and an upper laminator box assembly, generally referred to by the reference numeral 84. The laminator box assemblies 83 and 84 are of a similar construction, but are reversed, as is best shown in FIGS. 10 and 11.

The laminator box assembly 83 includes a pair of longitudinally extending frame members 85 which are connected together at longitudinally spaced intervals by a plurality of spacer blocks 86. The underside of the laminator box assembly 83 is formed by a panel 87 which underlies the frame members 85 and is suitably secured thereto. Also, the ends of the laminator box assembly 83 are formed by a pair of end panels 88 and 89. Standards 90 and 91 are secured to the frame members 85 adjacent the opposite ends thereof and extend upwardly therefrom.

A lower conveyor 92 is carried by the frame members 85. The conveyor 92 is of the endless belt type and includes a pair of rollers 93 and 94. The roller 93 includes a shaft 95, the opposite ends of which are rotatably journaled in pillow blocks 96 carried by the left ends of the frame members 85, as viewed in FIG. 11. The roller 94 includes a shaft 97, the opposite ends of which are rotatably journaled in suitable bearings 98 which are adjustably supported at the right ends of the frame members 85 by means of adjustable supports 99. An endless conveyor belt 100 is entrained over the rollers 93 and 94. The tension of the conveyor belt 100 is controlled by longitudinally shifting the bearings 98. It is to be noted that the conveyor belt 100 has an upper run 101 and a lower run 102. The upper run is disposed generally coplanar with the upper edges of the end panels 88 and 89. On the other hand, the lower run 102 is disposed adjacent the bottom panel 87 and underlies the spacer blocks 86.

An air chamber, generally referred to by the numeral 103, underlies the upper run 101, and the upper run 101 forms a part of this air chamber. The air chamber 103 is formed of a backing panel 104 which may be in the form of a honeycomb sandwich panel, as is best shown in FIGS. 15 and 17. The backing panel 104 includes a wooden frame 105 which extends about the periphery thereof. A plurality of longitudinally extending rub rails 106 overlie the upper surface of the backing panel 104. Normally the rub rails 106 have no function, but may engage the underside of the upper run 101 should the upward pressure thereon be removed.

A pair of longitudinal strips 107 overlie the upper surface of the backing panel 104 adjacent the side edges thereof. Similar transverse strips 108 overlie the upper surface of the backing panel 104 at the ends thereof. Each of the strips 107 and 108 supports a flexible sealing strip 109. The sealing strip 109 may be formed of any material, but are preferably formed of a resilient plastic material which has good wearing qualities, such as "Teflon." As is best shown in FIG. 18, the sealing strip 109 has a major portion thereof directly underlying the upper run 101 so as to provide a wide contact area between the sealing strip 109 and the upper run 101 of the conveyor belt 100. In this manner a substantially air-tight chamber is formed, the chamber being primarily bordered by the upper run 101 and the backing panel 104. The purpose of this air-tight chamber will be described in detail hereinafter.

The upper laminator box assembly 84 includes a pair of longitudinal frame members 110 which are transversely spaced, and which are connected together by transverse spacer blocks 111. The top wall of the laminator box assembly 84 is formed by a panel 112. Ends of the laminator box assembly 84 are formed by end panels 113 and 114. It is to be noted that the end panels 113 and 114 lie in the same vertical planes as the end panels 88 and 89, respectively.

An endless conveyor, generally referred to by the numeral 115, is supported by the frame members 110. The endless conveyor 115 includes a pair of rollers 116 and 117. The roller 116 includes a shaft 118, the ends of which are rotatably journaled in pillow blocks 119 secured to the underside of the frame members 110 in depending relation. The roller 117 includes a shaft 120, the ends of which are rotatably journaled in suitable bearing members 121. The bearing members 121 are supported in depending relation from the frame members 110 for movement longitudinally of the frame members 110 by means of adjustable fittings 122. An endless conveyor belt 123 is entrained over the rollers 116 and 117. The conveyor belt 123 is tensioned by adjusting the position of the roller 117 through the adjustment of the positions of the bearing members 121.

An air chamber, generally referred to by the numeral 124, overlies a bottom run of the conveyor belt 123, the bottom run being referred to by the numeral 125, The air chamber 124 is identical with the air chamber 103, except for being inverted. Accordingly, the specific details of the air chamber 124 will not be described here. The conveyor belt 123 also includes an upper run 126 which passes above both the air chamber 124 and the spacer blocks 111. The upper run 126 is supported intermediate its ends by idler rollers 127 which, in turn, are supported by suitable bearing members 128 which are secured to the underside of the frame members 110.

Each of the frame members 85 is provided with a plurality of upstanding rods 129. The rods 129 function as guides for the upper laminator box assembly 84. The frame members 110, as is best shown in FIGURE 14, are provided with apertures 130 through which upper portions of the guide rods 129 pass. Thus the alignment of the upper laminator box assembly 84 with the lower laminator box assembly 83 is assured.

The frame members 110 are provided with mounting lugs 131 adjacent the ends thereof. The mounting lugs 131 are received in the standards 90 and 91, which are of a channel shape, and are releasably secured to the standards 90 and 91. In this manner the upper laminator box assembly 84 may be vertically adjusted with respect to the lower laminator box assembly 83. This vertical adjustment is necessary in order that the laminator box 7 may accommodate honeycomb sandwiches of varying thicknesses.

In order to complete the laminator box assemblies 83 and 84, they are provided with side panels 132. The side panels 132 are disposed outwardly of the frame members 85 and 110 and are clamped in place against the edges of these frame members by suitable clamps 133, which clamps are mounted on the standards 90 and 91 in the positions best illustrated in FIG. 11. By securing the side panels 132 in place by means of the clamps 133, it will be readily apparent that the side panels 132 may be easily and quickly removed to provide access to the interior of the laminator box 7. On the other hand, the side panels 132 are so mounted that they permit the vertical adjustment of the upper laminator box assembly 84 with respect to the lower laminator box assembly 83 while maintaining the necessary seal. Incidentally, the end panels 88, 89, 113 and 114 extend the full width of the space between the side panels 132 and for frictional engagement with the inner surfaces of the side panels 132.

Reference is now had to FIGURES 8 and 9 wherein the details of supports for the laminator box 7 are illustrated, each of the supports being generally referred to by the numeral 134. The support 134 is of a trestle type and includes an upper horizontal member 135 which is of a downwardly open channel shape. A pair of generally triangular legs 136 are pivotally connected to the upper frame member 135, the connection between each leg 136 and the frame member 135 being formed by a pivot pin 137. Each of the legs 136 includes a lower cross bar 138. Diagonal braces 139 extend down from the central part of the frame member 135 and are connected to the cross bars 138 to brace the legs 136. The legs 136 are provided with feet 140 which, in turn, carry leveling screws 141.

The bottom panel 87 has a frame 142 which is formed of channel members, as is best shown in FIGURES 8 and 16. The frame 142 is employed to support the laminator box 7 on the supports 134. As is best shown in FIG. 8, each support 134 includes a pair of brackets 143. The brackets 143 are seated on the ends of the upper frame member 135 and are secured thereto by fasteners 144. Each of the brackets 143 has a portion which is engaged within one of the channel frame members of the frame 142 so as to interlock the frame 142 with a respective one of the supports 134. The brackets 143 should be suitably rigidly secured to the frame 142.

Referring once again to FIG. 1, it will be seen that the apparatus 6 is supported at a height so that the honeycomb core 63 is in alignment with the laminator box 7. This is accomplished by providing suitable legs 145 at the corners of the frame 14. These legs are partially shown in FIG. 3.

The control unit 11 primarily includes a heater assembly which will be described hereinafter. The control unit 11 also includes a suitable housing or cabinet 146. The cabinet 146 is generally rectangular in outline and a plurality of air ducts extend therefrom. The air ducts include a pair of hot air ducts 147 and 148 which are connected together as at 149 into a main hot air duct 150. A main hot air duct 150 extends alongside the laminator box 7, and is provided with a Y fitting 151 at the right end thereof, as viewed in FIGS. 1 and 2. A lower pipe 152 and an upper pipe 153 extend from the Y fitting 151. The lower pipe 152 terminates into the lower part of the end panel 89 through an opening 154. The upper pipe 153 terminates into the upper part of the end panel 114 through an opening 155. The openings 154 and 155 are best illustrated in FIG. 7. It is to be noted that the hot air from the pipe 152 passes below the lower run 102 of the conveyor belt 100, and the hot air from the pipe 153 passes above the upper run 126 of the conveyor belt 123.

The upper return duct 156 is connected to the left end portion of the upper laminator box assembly 84. A second return duct 157 is connected to the left end of the laminator box assembly 83. The return ducts 156 and 157 are connected to a bonnet 158 mounted on the cabinet 146.

A pressurized air line 159 extends from that side of the cabinet 146 adjacent the laminator box 7. The air line 159 is connected to a lower end of an upstanding air line 160 which is carried by the lower laminator box assembly 83, as is shown in FIG. 11. The air line 160 includes a T fitting 161 to which an air duct 162 for the air chamber 103 is connected. The air duct 162 passes upwardly through a fitting 163 formed in the backing panel 104, the fitting 163 being best shown in FIGURES 17 and 20. In this manner air under pressure is supplied to the space between the upper run 101 of the conveyor belt 100 and the upper surface of the backing panel 104.

The air line 160 has a sleeve 164 telescoped over the upper end thereof. An air duct 165 for the air chamber 124 extends down into the sleeve 164 to provide a telescopic connection between the air line 160 and air duct 165. The air duct 165 extends down in a fitting, such as the fitting 163, in the backing panel of the air chamber 124.

It is pointed out at this time that the backing panels for the air chambers 103 and 124, such as the backing panel 104, are formed of sections of honeycomb sandwiches. Although the details of the bottom panel 87, the top panel 112, the end panels 88, 89, 113 and 114, and the side panels 132 have not been illustrated, it is to be understood that they too may be formed of sections of a honeycomb sandwich. It is particularly desirable that the panels of the laminator box 7 be insulated in order to retain the heat of the air delivered to the laminator box. The honeycomb sandwiches provide extra heat insulation.

Referring once again to FIG. 11, it will be seen that a pair of guide rollers 166 and 167 are mounted on the standards 90 and extend between the standards 90. The facing web from the roll 9 passes up and over the guide roller 166 and then down under the conveyor belt 100. The facing web of the roll 9 then passes around a right end of the conveyor 92 and over the top run 101 of the endless conveyor belt 100. The facing web from the roll 8 passes downwardly under the guide roller 167 and up over the endless conveyor 115. This facing web passes along the top run 126 of the endless belt 123 and down around the right end of the conveyor 115. The facing web of the roll 8 then passes beneath the bottom run of the belt 123. It will thus be apparent that the facing webs from the rolls 8 and 9 are disposed above and below the honeycomb 63 which is passed between the runs 101 and 125 of the conveyor belts 100 and 123 respectively.

Since the area of the laminator box assembly 83 below the bottom run 102 of the conveyor belt 100 is heated and since a similar portion of the laminator box assembly 84 above the upper run 126 of the endless belt 123 is heated, it will be readily apparent that the facing webs applied to the opposite faces of the honeycomb core 63 will be pre-heated prior to their application to the honeycomb core.

Figure 24:
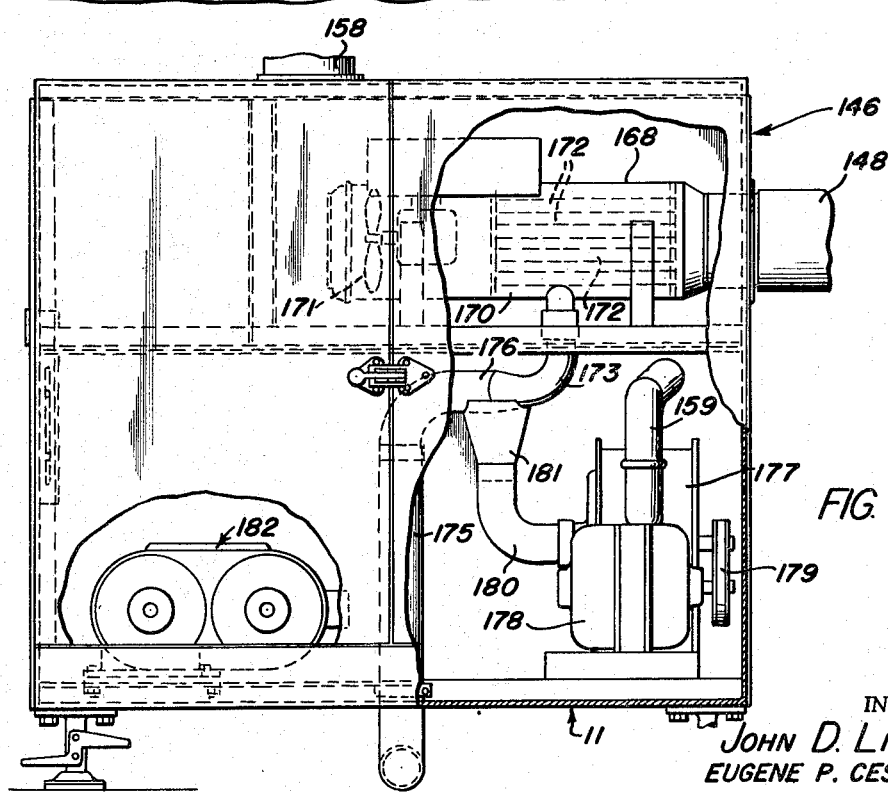
FIG. 24 is an enlarged elevational view of the heater with a portion of the housing broken away to show further the details of the internal arrangement of the heater.

Referring now to FIGS. 22, 23 and 24, the details of the control unit 11 are illustrated. A pair of commercially obtainable heaters 168 and 169 are mounted in the upper part of the cabinet 146. Each of the heaters 168 and 169 includes a combustion chamber 170 into which a liquid fuel, such as gasoline, is delivered and ignited in the customary manner. The left end of each of the heaters 168 and 169, as viewed in FIG. 24, is provided with a blower 171 which receives its air from the bonnet 158. The individual blower 171 directs air into heating tubes 172 which extend through the combustion chamber 170 whereby a heat exchange occurs to heat the air passing through the heaters 168 and 169. The heating tubes 172 open into the air ducts 147 and 148.

Although two heaters 168 and 169 have been provided, it will not be necessary that both of the heaters be always operated. If desired, suitable controls, not shown, may be provided for cycling the operation of the heaters 168 and 169.

The heaters 168 and 169 have exhaust pipes 173 and 174, respectively, which open into a common exhaust pipe 175 through a Y fitting 176. The exhaust pipe 175 may be led off to any desired area.

A turbine 177 is mounted within the cabinet 146 below the heaters 168 and 169. The turbine 177 is driven by an electric motor 178 and is coupled to the motor 178 by the drive belt assembly 179. The pressurized air line 159 is connected to the outlet of the turbine 177. The turbine 177 also includes an inlet pipe 180 which has an intake 181 at the upper end thereof. The intake 181 directly underlies the Y fitting 176 so that air passing into the intake 181 must flow over the Y fitting 176. In this manner the air delivered to the air chambers 103 and 124 by the turbine 159 is heated.

A drive unit, generally referred to by the numeral 182, is also mounted in the lower portion of the cabinet 146, but is offset generally from the heaters 168 and 169, as is shown in FIG. 23. The drive unit 182 includes an electric motor 183 and a variable reduction unit 184. The variable reduction unit 184 is coupled to the electric motor 183 and the reduction ratio may be manually selectively varied. The reduction unit includes an output shaft 185 which opens through that side of the cabinet 146 facing the laminator box 7.

Although the controls for the heaters 168 and 169, the electric motor 178 for the turbine 177, and the electric motor 183 of the drive unit 182 have not been illustrated, it is to be understood that conventional controls may be employed for the automatic operation of these units.

A drive sprocket 186 is mounted on the output shaft 185. The drive sprocket 186 is in alignment with a sprocket 187 which is mounted on the shaft 95 of the roller 93. A drive chain 188 passes over the drive sprockets 186 and 187 to couple the two together. In this manner the lower conveyor 92 is driven. The upper conveyor 115 is not positively driven, as is the lower conveyor 92. However, the frictional contact between the elements of the honeycomb sandwich, passing between the conveyors 92 and 115, and the conveyors 92 and 115 is sufficient to drive the conveyor 115 from the conveyor 92.

The opposite end of the shaft 95 is provided with a right angle drive unit 189. The right angle drive unit 189 includes an output shaft 190 which extends longitudinally of the laminator box 7. The opposite end of the previously described flexible shaft 66 is secured to the output shaft 190 whereby the shaft 51 is driven from the shaft 95.

Reference is now had to FIGURE 25 wherein the honeycomb core 63 is shown in detail. The honeycomb core 63 has had the adhesive 191 applied to the face edges thereof. The adhesive 191, being applied to the moving honeycomb core 63 by adhesive applicator rolls, is in the form of a fillet projecting outwardly of the edge surface of the honeycomb core 63 and generally parallel thereto. By so applying the adhesive 191, a much larger area of bond may be obtained.

*Operation*

In the manufacture of a honeycomb panel, it is first necessary to form a honeycomb sandwich. The first step in forming the honeycomb sandwich is to form the honeycomb core 63. The honeycomb core 63, in accordance with this invention, is formed from a block. After the block has been laid up in a conventional manner, slices are removed from the block. These slices are passed into the apparatus 6, where the slices are expanded to form the honeycomb core 63. As the honeycomb core 63, after being expanded, passes between the adhesive applicator rolls 49 and 50, the adhesive 191 is applied thereto in the manner illustrated in FIG. 25. The adhesive may be one of many types suitable for the formation of honeycomb sandwiches, and since the invention is not limited to any particular adhesive, no attempt will be made to describe the adhesive which may be utilized.

Simultaneous with feeding of the honeycomb core 63 into the laminator box 7, facing webs are pulled from the rolls 8 and 9. The facing webs are pre-heated during their passage through the laminator box assemblies 83 and 84 and are disposed in face-to-face engagement with the surfaces of the honeycomb core 63. The facing webs or sheets are urged into pressure contact with the honeycomb core 63 by the conveyor belt runs 101 and 125 so that the necessary contact between the facing sheets and the honeycomb core is maintained during the travel of the components of the honeycomb sandwich through the laminator box; the conveyor belt runs 101 and 125 being uniformly urged into clamping engagement with the facing webs by the pressurized air within the air chambers 103 and 124 which acts directly on the conveyor belt runs 101 and 125. By maintaining an even and constant pressure through the pressure applying force of the conveyor belts, the desired bond between the facing sheets and the honeycomb core is obtained.

The honeycomb sandwich exits from the laminator box 7 in the form of a continuous member. However, it cannot be used in the lengths in which it is formed. Accordingly, the saw 13 may be used for transversely cutting the sandwich into panels of the desired length. Of course, the honeycomb sandwich may be readily sawed into shapes which may be desired.

In numerous places the honeycomb core 63 has been described as being a single slice of a honeycomb block. However, in order to form a continuous core, it will be necessary to adhesively connect together numerous slices of honeycomb. Also, it is not necessary that the honeycomb core be expanded and fed into the laminator in a continuous operation, although it is preferred. If desired, the honeycomb core 63 may be separately expanded and under certain conditions it may also be rigidified.

While one form of the invention has been shown for purposes of illustration, it is to be understood that various changes in the details of construction and arrangement of parts may be made without departing from the spirit and scope of the invention as defined in the appended claims.

It is claimed:

1. In an apparatus for laminating a continuous honeycomb sandwich; a mechanism for applying continuous facings to a moving continuous honeycomb core, said mechanism including a pair of endless conveyors having conveyor belts with opposed generally parallel runs and remote runs, said mechanism including an entrance end and an exit end, means for delivering an adhesive coated continuous honeycomb core to said mechanism at said entrance end, means for introducing facing forming material adjacent said mechanism exit end, guide means positioned relative to said conveyors for first guiding facing forming material along said conveyor belt remote runs and then along said conveyor belt opposed runs, and means for applying pressure to said conveyor belt opposed runs to urge said conveyor belts into clamping engagement with a honeycomb sandwich passing therebetween.

2. The mechanism of claim 1 wherein the means for applying pressure to said conveyor belt opposed runs includes air at above atmospheric pressure directly applied to said conveyor belts.

3. The mechanism of claim 1 together with means for preheating facing forming material prior to the application thereof to a honeycomb core.

4. The mechanism of claim 1 wherein the means for delivering an adhesive coated honeycomb core includes a pair of adhesive applying rolls disposed in spaced relation relative to each other and above and below a honeycomb core, said glue applying rolls having a wiping relation to a honeycomb core passing therebetween whereby a fillet of adhesive is applied to each edge surface of the honeycomb core.

5. The mechanism of claim 1 wherein the means for delivering an adhesive coated honeycomb core includes a first pair of feed rolls, a second pair of feed rolls spaced from said first pair of feed rolls towards said mechanism entrance end, means for driving said first and second pair of feed rolls with said second pair of feed rolls having a greater peripheral speed to expand the honeycomb core, and a pair of adhesive applying rolls disposed in spaced relation relative to each other and above and below a honeycomb core, said adhesive applying rolls having a wiping relation to a honeycomb core passing therebetween whereby a fillet of adhesive is applied to each edge surface of the honeycomb core.

6. The mechanism of claim 5 wherein uppermost ones of said conveyor belts, said first and second feed rolls, and said adhesive applying rolls are mounted for vertical movement to accommodate honeycomb cores of different thicknesses.

7. The mechanism of claim 5 wherein uppermost ones of said first and second pairs of feed rolls and said adhesive applying rolls are mounted on common support members, and means are provided for vertically-adjustably positioning said support members to accommodate honeycomb cores of different thicknesses.

8. In an apparatus for laminating a continuous honeycomb sandwich; a mechanism for applying continuous facings to a moving continuous honeycomb core, said mechanism including a pair of endless conveyors having conveyor belts with opposed generally parallel runs and remote runs, said mechanism including an entrance end and an exit end, means for delivering an adhesive coated continuous honeycomb core to said mechanism at said entrance end, means for supporting rolls of facing forming material adjacent said mechanism exit end, guide means positioned relative to said conveyors for first guiding facing forming material along said conveyor belt remote runs and then along said conveyor belt opposed runs, an air chamber facing a remote face of each of said conveyor belt opposed runs, portions of said conveyor belts opposed runs forming walls of said air chambers and being sealed relative thereto, and means for supplying air under pressure to said air chambers to urge said conveyor belts into clamping engagement with a honeycomb sandwich passing therebetween.

9. The mechanism of claim 8 together with a heater, and means for transferring heat from said heater to facing forming material for preheating facing forming material prior to the application thereof to a honeycomb core.

10. The mechanism of claim 8 together with a heater, and means for transferring heat from said heater to said air for said air chamber.

11. The mechanism of claim 8 together with a heater, and means for transferring heat from said heater to both said air for said air chamber and facing forming material for preheating facing forming material prior to the application thereof to a honeycomb core.

12. In an apparatus for laminating a continuous honeycomb sandwich; a mechanism for applying continuous facings to a moving continuous honeycomb core, said mechanism including upper and lower laminator boxes, said lower laminator box including a lower frame, standards extending upwardly from said lower frame, end and bottom coverings secured to said lower frame, a lower endless conveyor disposed within the general confines of said lower laminator box, said lower conveyor including a lower endless belt having an upper run, first pressure exerting means carried by said lower frame uniformly urging said lower belt upper run downwardly, said upper laminator box including an upper frame, connecting means securing said upper frame to said standards in overlying relation to said lower frame, an upper endless conveyor disposed within the general confines of said upper laminator box, said upper conveyor including an upper endless belt having a lower run disposed generally parallel to said lower belt upper run, second pressure exerting means carried by said upper frame uniformly urging said upper belt lower run downwardly, side panels connected to said upper and lower frames and forming sides of said laminator boxes, and guide means for guiding first facing forming material below said lower conveyor and second facing forming material above said upper conveyor, said facing material passing around ends of said conveyors and between said upper and lower runs in engagement with said runs, and heater means for applying heated air to said laminator boxes for preheating facing forming material prior to the application thereof to a honeycomb core.

13. In an apparatus for laminating a continuous honeycomb sandwich; a mechanism for applying continuous facings to a moving continuous honeycomb core, said mechanism including upper and lower laminator boxes, said lower laminator box including a lower frame, standards extending upwardly from said lower frame, end and bottom coverings secured to said lower frame, a lower endless conveyor disposed within the general confines of said lower laminator box, said lower conveyor including a lower endless belt having an upper run, first pressure exerting means carried by said lower frame uniformly urging said lower belt upper run downwardly, said upper laminator box including an upper frame, connecting means securing said upper frame to said standards in overlying relation to said lower frame, an upper endless conveyor disposed within the general confines of said upper laminator box, said upper conveyor including an upper endless belt having a lower run disposed generally parallel to said lower belt upper run, second pressure exerting means carried by said upper frame uniformly urging said upper belt lower run downwardly, side panels connected to said upper and lower frames and forming sides of said laminator boxes, and guide means for guiding first facing forming material below said lower conveyor and second facing forming material above said upper conveyor, said facing material passing around ends of said conveyors and between said upper and lower runs in engagement with said runs, an air heater, and duct means connected to said air heater and said laminator boxes for circulating heated air within said laminator boxes below said lower conveyor and above said upper conveyor to preheat facing forming material prior to the application thereof to a honeycomb core.

14. The mechanism of claim 13 wherein said first and second pressure exerting means includes air under pressure directly applied to said conveyor belts, and said last mentioned air is heated from said heater.

15. The mechanism of claim 13 wherein said first and second pressure exerting means includes air under pressure directly applied to said conveyor belts, said last mentioned air being pressurized by blower means, said heater having an exhaust pipe for exhaust gases, and said blower means having an intake aligned with and directly adjacent to said exhaust pipe whereby air drawn into said intake is heated.

16. In an apparatus for laminating a continuous honeycomb sandwich; a mechanism for applying continuous facings to a moving continuous honeycomb core, said mechanism including a pair of endless conveyors having conveyor belts with opposed generally parallel runs and remote runs, said mechanism including an entrance end and an exit end, means for delivering an adhesive coated continuous honeycomb core to said mechanism at said entrance end, means for introducing facing forming material adjacent said mechanism exit end, guide means positioned relative to said conveyors for first guiding facing forming material along said conveyor belt remote runs and then along said conveyor belt opposed runs, means for applying pressure to said conveyor belt opposed runs to urge said conveyor belts into clamping engagement with a honeycomb sandwich passing therebetween, and a cut-off saw disposed adjacent said exit end for cutting a continuous honeycomb sandwich into panels.

17. In an apparatus for laminating a continuous honeycomb sandwich; a mechanism for applying continuous facings to a moving continuous honeycomb core, said mechanism including a pair of endless conveyors having conveyor belts with opposed generally parallel runs and remote runs, said mechanism including an entrance end and an exit end, means for delivering an adhesive coated continuous honeycomb core to said mechanism at said entrance end, means for introducing facing forming material adjacent said mechanism exit end, guide means positioned relative to said conveyors for first guiding facing forming material along said conveyor belt remote runs and then along said conveyor belt opposed runs, means for applying pressure to said conveyor belt opposed runs to urge said conveyor belts into clamping engagement with a honeycomb sandwich passing therebetween, and means adjustably supporting one of said conveyor belts relative to the other of said conveyor belts to accommodate components of honeycomb sandwiches of varied thicknesses.

18. The mechanism of claim 1 wherein one of said conveyor belts has means mounting it for idling movement, and drive means connected to the other of said conveyor belts for driving said other conveyor belt with said one conveyor belt being driven by said other conveyor belt through elements of a honeycomb sandwich passing therebetween.

19. In an apparatus for laminating a continuous honeycomb sandwich; a mechanism for applying continuous facings to a moving continuous honeycomb core, said mechanism including a pair of endless conveyors having conveyor belts with opposed generally parallel runs and remote runs, said mechanism including an entrance end and an exit end, means for delivering an adhesive coated continuous honeycomb core to said mechanism at said entrance end, means for introducing facing forming material adjacent said mechanism exit end, guide means positioned relative to said conveyors for first guiding facing forming material along said conveyor belt remote runs and then along said conveyor belt opposed runs, and means for applying pressure to said conveyor belt opposed runs to urge said conveyor belts into clamping engagement with a honeycomb sandwich passing therebetween, the means for delivering an adhesive coated honeycomb core includes a pair of adhesive applying rolls disposed in spaced relation, means for feeding the honeycomb core between said adhesive applying rolls with said adhesive applying rolls having a wiping relation to the honeycomb core whereby a fillet of adhesive is applied to each edge surface of the honeycomb core.

20. The mechanism of claim 19 wherein said adhesive applying rolls are mounted with one being moved relative to the other to adjust the spacing therebetween, a drive mechanism for driving said adhesive applying rolls including a circular drive member connected to each adhesive applying roll, a pair of intermediate circular drive members drivingly engaging each other, and means adjustably supporting said intermediate circular drive members to drivingly engage one of each of said first mentioned circular drive members in the varied spaced positions of said adhesive applying roll.

21. In an apparatus for laminating a continuous honeycomb sandwich; a mechanism for applying continuous facings to a moving continuous honeycomb core, said mechanism including a pair of endless conveyors having conveyor belts with opposed generally parallel runs and remote runs, said mechanism including an entrance end and an exit end, means for delivering an adhesive coated continuous honeycomb core to said mechanism at said entrance end, means for supporting rolls of facing forming material adjacent said mechanism exit end, guide means positioned relative to said conveyors for first guiding facing forming material along said conveyor belt remote runs and then along said conveyor belt opposed runs, means for applying pressure to said conveyor belt opposed runs to urge said conveyor belts into clamping engagement with a honeycomb sandwich passing therebetween, a chamber receiving said remote run of each of said conveyor belts, and means for heating said chambers to preheat facing forming material passing along said conveyor belt remote runs.

22. In an apparatus for laminating a continuous honeycomb sandwich; a mechanism for applying continuous facings to a moving continuous honeycomb core, said mechanism including upper and lower laminator boxes, said lower laminator box including a lower frame, standards extending upwardly from said lower frame, end and bottom coverings secured to said lower frame, a lower endless conveyor disposed within the general confines of said lower laminator box, said lower conveyor including a lower endless belt having an upper run, first pressure exerting means carried by said lower frame uniformly urging said lower belt upper run upwardly, said upper laminator box including an upper frame, connecting means securing said upper frame to said standards in overlying relation to said lower frame, an upper endless conveyor disposed within the general confines of said upper laminator box, said upper conveyor including an upper endless belt having a lower run disposed generally parallel to said lower belt upper run, second pressure exerting means carried by said upper frame uniformly urging said upper belt lower run downwardly, side panels connected to said upper and lower frames and forming sides of said laminator boxes, and guide means for guiding first facing forming material below said lower conveyor and second facing forming material above said upper conveyor, said facing material passing around ends of said conveyors and between said upper and lower runs in engagement with said runs.

23. The mechanism of claim 22 wherein one of said conveyor belts has means mounting it for idling movement, and drive means connected to the other of said conveyor belts for driving said other conveyor belt with said one conveyor belt being driven by said other conveyor belt through elements of a honeycomb sandwich passing therebetween.

References Cited by the Examiner
UNITED STATES PATENTS

| | | | |
|---|---|---|---|
| 1,560,670 | 11/25 | Vries | 118—33 |
| 1,598,924 | 9/26 | Mayer | 118—33 |
| 2,135,763 | 11/38 | Nicholson | 154—1 |
| 2,171,259 | 8/39 | Scott | 156—322 |
| 2,219,805 | 10/40 | Buttress | 154—1.6 |
| 2,731,379 | 1/56 | Wheeler | 156—197 |
| 2,771,935 | 11/56 | Clemens | 154—1.6 |

EARL M. BERGERT, *Primary Examiner.*

ALEXANDER WYMAN, CARL F. KRAFFT,
*Examiners*